US010183582B2

(12) United States Patent
Croset

(10) Patent No.: US 10,183,582 B2
(45) Date of Patent: Jan. 22, 2019

(54) ENERGY STORAGE SYSTEM AND DRIVING AND ENERGY RECOVERY SYSTEM

(71) Applicant: ADETEL EQUIPMENT, Ecully (FR)

(72) Inventor: Alain Croset, Cugnaux (FR)

(73) Assignee: ADETEL TRANSPORTATION SOLUTION, Ecully (FR)

( * ) Notice: Subject to any disclaimer, the term of this patent is extended or adjusted under 35 U.S.C. 154(b) by 12 days.

(21) Appl. No.: 14/901,047

(22) PCT Filed: Jun. 4, 2014

(86) PCT No.: PCT/FR2014/051336
§ 371 (c)(1),
(2) Date: Dec. 27, 2015

(87) PCT Pub. No.: WO2014/207336
PCT Pub. Date: Dec. 31, 2014

(65) Prior Publication Data
US 2016/0368389 A1 Dec. 22, 2016

(30) Foreign Application Priority Data

Jun. 24, 2013 (FR) .................... 13 55978

(51) Int. Cl.
H02J 7/00 (2006.01)
B60L 11/18 (2006.01)
(Continued)

(52) U.S. Cl.
CPC ......... B60L 11/1809 (2013.01); B60L 3/0046 (2013.01); B60L 3/04 (2013.01);
(Continued)

(58) Field of Classification Search
CPC ..................................... H02J 7/0078
(Continued)

(56) References Cited

U.S. PATENT DOCUMENTS 6,275,006 B1 * 8/2001 Koike ............ H02J 7/0073
320/125
6,336,063 B1 * 1/2002 Lennevi ............ B60K 6/28
180/65.1
(Continued)

FOREIGN PATENT DOCUMENTS

EP 1 810 861 * 7/2007
EP 1810861 A1 7/2007
EP 2221208 A1 8/2010

OTHER PUBLICATIONS

International Search Report dated Jul. 31, 2014 re: Application No. PCT/FR2014/051336; citing: EP 1 810 861 A, EP 2 221 208 A1 and US 2006/103358 A1.

Primary Examiner — Yalkew Fantu
(74) Attorney, Agent, or Firm — Cantor Colburn LLP

(57) ABSTRACT

The present invention relates to a supercapacitive storage system (10) for the electricity of a vehicle, characterized in that it comprises a control device (12) arranged to allow charging of capacitive storage elements (11) or the storage system (10) when the voltage of the capacitive storage elements (11) is below or equal to a maximum voltage value of the operating range of a driving and energy recovery system (20), and to prohibit charging of the capacitive storage elements (11) when the voltage of the electricity distribution grid (2) is above a maximum operating voltage value of the capacitive storage elements (11), a driving and energy recovery system (20) and a control method.

9 Claims, 3 Drawing Sheets

(51) Int. Cl.
   *B60L 3/00*    (2006.01)
   *B60L 3/04*    (2006.01)
   *B60L 7/14*    (2006.01)
   *B60L 11/00*   (2006.01)
   *B60L 11/12*   (2006.01)

(52) U.S. Cl.
   CPC ............... *B60L 7/14* (2013.01); *B60L 11/005* (2013.01); *B60L 11/123* (2013.01); *B60L 11/1803* (2013.01); *B60L 11/1861* (2013.01); *B60L 2210/10* (2013.01); *B60L 2210/40* (2013.01); *B60L 2240/547* (2013.01); *B60L 2270/20* (2013.01); *Y02T 10/6217* (2013.01); *Y02T 10/7005* (2013.01); *Y02T 10/7022* (2013.01); *Y02T 10/7077* (2013.01); *Y02T 10/7216* (2013.01); *Y02T 10/7241* (2013.01); *Y02T 10/92* (2013.01)

(58) Field of Classification Search
   USPC ........................................................ 320/166
   See application file for complete search history.

(56) References Cited

U.S. PATENT DOCUMENTS

| | | | |
|---|---|---|---|
| 6,624,529 B2 * | 9/2003 | Obayashi | H02J 1/14 290/40 B |
| 8,525,488 B2 * | 9/2013 | Fuchs | F02D 41/2096 310/316.03 |
| 2002/0113441 A1 * | 8/2002 | Obayashi | H02J 1/14 290/40 C |
| 2006/0103358 A1 * | 5/2006 | Schulte | B60L 7/06 320/166 |
| 2014/0266068 A1 * | 9/2014 | O'Brien | H02J 7/0093 320/139 |

* cited by examiner

ENERGY STORAGE SYSTEM AND DRIVING AND ENERGY RECOVERY SYSTEM

TECHNICAL FIELD

The present invention concerns the field of electric vehicles and, more particularly, the invention concerns an electrical energy storage system of a vehicle, a drive and energy recovery system of said vehicle, such vehicle as well as a method for controlling the electrical energy of a vehicle.

BACKGROUND

Most of the used recent electric vehicles, either road vehicles or naval vehicles or vehicles in public transport networks, include an electrical power distribution network also called DC bus on which is connected a drive and energy recovery system configured to operate in a given operating voltage range, and a storage system.

The present invention focuses on vehicles whose storage system comprises capacitive storage elements likely to be charged by a charging voltage delivered by the electrical power distribution network and comprised in the range of operation of the drive and energy recovery system.

The drive and energy recovery system generally comprises a reversible electric machine enabling an operation according to a mode called <<motor>> so as to ensure the driving or the traction/propulsion of the vehicle using a supplied electrical energy and enabling alternately an operation according to a mode called <<generator>> so as to ensure the conversion of the mechanical energy due to the braking or to the deceleration of the vehicle into electrical energy.

In the motor mode, the motor consumes electrical energy supplied thereto by the capacitive storage elements of the storage system.

In the generator mode, the motor produces electrical energy and charges the capacitive storage elements of the storage system.

The thermal/electric hybrid vehicles further comprise a thermal motor that can ensure by itself the driving of the vehicle but may also drive the reversible electric machine so as to make it operate in the generator mode.

Electrical energy supplied by the motor in the generator mode is then transmitted to the electrical power distribution network of the vehicle and recovered by the capacitive elements of the storage system in the same manner as during a braking or a deceleration of the vehicle.

In a known manner, the capacitive storage elements comprise in particular an assembly of double layer capacitances, also called supercapacitances, supercapacitors or EDLC (Electrolytic Double Layer Capacitor) in which electrical energy is stored.

This electrical energy stored in the capacitive storage elements may then be used as main or auxiliary energy for supplying the electric motor of the electric vehicle.

Furthermore, it is known to have a storage system comprising a DC-DC converter connected to the electrical power network of the vehicle and a drive and energy recovery system comprising a means for converting the current also connected to the electrical power network of the vehicle.

The DC-DC converter enables adapting the variable voltage of the capacitive storage elements of the storage system to the operating DC voltage of the drive and energy recovery system of the vehicle.

Furthermore, the DC-DC converter must be able, on the one hand to transfer in the motor mode the traction/propulsion total power from the capacitive storage elements of the storage system to the reversible electric machine via the electrical power network of the vehicle, and on the other hand to transfer in the generator mode the total braking power from the reversible electric machine to the capacitive storage elements of the storage system via the electrical power network of the vehicle.

As for the current converter, it allows to make the power supplied to the reversible electric machine in the motor mode vary depending on a control caused by a user for example by means of the accelerator pedal of the vehicle or any other controller.

The current converter must also be able to transfer the electrical energy coming from the reversible electric machine when it operates in the generator mode to the capacitive storage elements of the storage system via the DC-DC converter.

In a known manner per se, the current converter may either be a speed variator or an inverter.

A storage system connected to such drive and energy recovery system via the power distribution network of the vehicle is satisfactory in that it can be easily adapted to an existing traction/propulsion chain and enables decoupling the traction/propulsion and the storage functions.

These two functions are generally processed by two different sectors within a same company and the integration of a storage system and a drive and energy recovery system on the same electrical power distribution network of a vehicle does not require the intervention of the skilled in the art having carried out the traction/propulsion function of the vehicle.

However, a coupling between such storage system and such drive and energy recovery system has the drawback of accumulating the efficiencies of two converters, the one of the DC-DC converter and the one of the current converter which also comprises a static converter.

This cumulation of efficiencies decreases strongly the energy efficiency of the coupling between a storage system and a drive and energy recovery system due to cumulative conversion losses.

Moreover, such storage system also has the drawback of having to use a DC-DC converter having a significant overall dimension and mass.

BRIEF SUMMARY

The present invention aims to overcome all or part of the aforementioned drawbacks, by providing an alternative to the use of a DC-DC converter in the storage system, particularly by controlling the storage system.

To this end, the present invention aims to an electrical energy storage system of a vehicle, intended to be connected to an electrical power distribution network, this vehicle including a drive and energy recovery system connected to the electrical power distribution network, said drive and energy recovery system being configured to operate in an operating voltage range, the storage system including:

capacitive storage elements comprising a maximum operating voltage and being able to be charged by a charging voltage delivered by the electrical power distribution network comprised in the range of operation of the drive and energy recovery system, said storage system being characterized in that it comprises a control device arranged to:

authorize the charging of the storage elements when the voltage of the storage elements is lower than or equal to the maximum voltage value of the range of operation of the drive and energy recovery system, prohibit the charging of the capacitive storage elements when the voltage of the electrical power distribution network of the vehicle is greater than the maximum operating voltage value of the storage elements.

Such electrical energy storage system of a vehicle increases the efficiency of the coupling with a drive and energy recovery system and ensures the voltage adaptation between the storage elements and the drive and energy recovery system.

Indeed, the storage system no longer requires a DC-DC converter. Thus, only the efficiency of the current converter is taken into account which limits losses by conversion cumulation.

In addition, the mass as well as the overall dimension of such storage system is decreased.

According to one aspect of the invention, the control device includes a member for measuring the voltage delivered by the storage elements or by the electrical power distribution network of the vehicle adapted to transmit to the drive and energy recovery system a piece of information intended to cause the energy recovery by the drive and energy recovery system to stop.

This disposition enables monitoring the voltage of the storage elements so as to generate a setpoint comprising interrupting, when necessary, the charging of the storage elements by directly stopping the energy recovery.

The interruption of the charging may be made either by acting on the processing of the setpoint of the drive and energy recovery system, or by acting on an electrical insulator associated to the storage system, for example by plugging off its electrical connection with the electrical power distribution network.

According to one aspect of the invention, the control device comprises electrical insulator arranged to interrupt the energy recovery during a braking, preferably by interrupting the supply of electrical energy by the drive and energy recovery system.

This disposition enables interrupting the electrical connection between the storage elements and the drive and energy recovery system so as to protect the storage elements from possible overvoltages.

According to one aspect of the invention, the storage system comprises a first charging device called pre-charging device intended to be connected on the electrical power distribution network between the storage elements and the drive and energy recovery system.

This disposition allows the storage elements to reach their minimum operating voltage when the vehicle is turned on while limiting the inrush current.

According to one aspect of the invention, the storage elements include an assembly of supercapacitances arranged to supply more than 75% of their energy flow available in the range of operation of the drive and energy recovery system.

The available energy is defined by the following formula:

$$E = \frac{1}{2}CV^2$$

wherein E is the value of the available energy E and is expressed in joule, C is the value of the equivalent capacitance of the combination in series and/or in parallel of the storage elements and is expressed in Farad, V is the total voltage value delivered by the assembly of the storage elements and is expressed in volt.

According to one aspect of the invention, the supercapacitances are mounted in series and/or in parallel.

The present invention also aims to a drive and energy recovery system of a vehicle, this vehicle including:

an electrical power distribution network, and an electrical energy storage system of the vehicle, such as described hereinabove, connected to the electrical power distribution network, the drive and energy recovery system being characterized in that the operating voltage range of the drive and energy recovery system corresponds to the operating voltage range of the current converter.

According to one aspect of the invention, the drive and energy recovery system comprises a generator arranged to operate on an operating voltage range, said operating voltage range of the generator comprising a minimum voltage value corresponding to the minimum value of the operating voltage range of the current converter.

Thus, the energy chiefly used is the one coming from the storage system, the generator energy succeeding when the storage system, while discharging, reaches the operating voltage of the generator.

Similarly, during an energy recovery phase, the no-load voltage of the generator corresponds to the charging start voltage of the storage system.

The present invention also aims to an electric vehicle comprising an electrical power distribution network on which is connected a storage system as described hereinabove and a drive and energy recovery system as described hereinabove.

The present invention also aims to a method for controlling an electrical energy storage system of a vehicle, this vehicle including:

an electrical power distribution network, and a drive and energy recovery system connected to the electrical power distribution network, the storage system including:

capacitive storage elements comprising a maximum operating voltage and being likely to be charged by a charging voltage delivered by the electrical power distribution network comprised in the range of operation of the drive and energy recovery system, said drive and energy recovery system being configured to operate in an operating voltage range, said control method being characterized in that it comprises a step comprising controlling the charging voltage of the storage elements or the voltage of the electrical power distribution network of the vehicle so as to:

authorize the charging of the storage elements when the voltage of the storage elements is lower than or equal to the maximum voltage value of the range of operation of the drive and energy recovery system, or prohibit the charging of the capacitive storage elements when the voltage of the electrical power distribution network of the vehicle is greater than the maximum operating voltage value of the capacitive storage elements.

According to one mode of implementation of the method, the step for controlling the charging voltage of the capacitive storage elements or the voltage of the electrical power distribution network of the vehicle comprises substeps comprising:

(i) measuring the voltage delivered by the capacitive storage elements or by the electrical power distribution network of the vehicle, and (ii) transmitting to the drive and energy recovery system a piece of information intended to cause the energy recovery by the drive and energy recovery system to stop.

BRIEF DESCRIPTION OF THE DRAWINGS

Anyway, the invention will be better understood using the following description, with reference to the appended schematic drawing showing, by way of non-limiting example, a storage system, a drive and energy recovery system or a vehicle implementing the steps of a method according to the invention.

DETAILED DESCRIPTION

Figure 1:
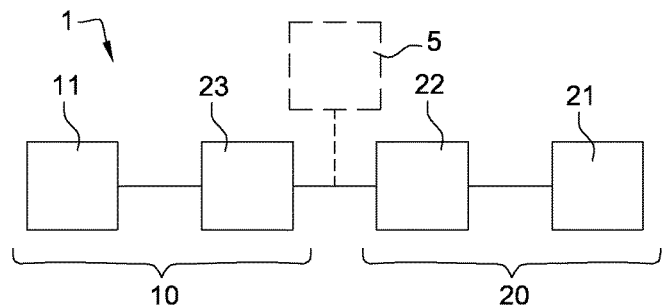
FIG. 1 represents a schematic diagram of an electrical power distribution network of the vehicle on which is connected a storage system of the state of the art as main or auxiliary energy and a drive and energy recovery system of the state of the art.
Figure 7:
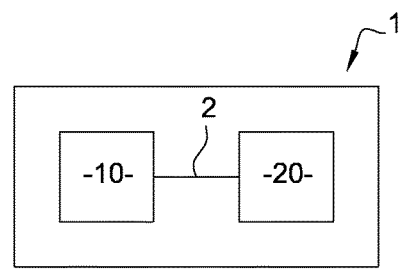
FIG. 7 is a block diagram of a vehicle according to the invention.

As illustrated in FIGS. 1 and 7, an electric vehicle 1 includes an electrical power distribution network 2 on which are connected a drive and energy recovery system 20 and a storage system 10.

According to the state of the art, the drive and energy recovery system 20 comprises a reversible electric machine 21 and a current converter.

In the shown example, the current converter 22 is a speed variator.

As for the storage system 10, it comprises capacitive storage elements 11 and a DC-DC converter 23.

In one mode of operation called motor mode of the drive and energy recovery system 20, the capacitive storage elements 11 of the storage system 10 deliver the electrical energy stored in the electrical power distribution network 2.

This electrical energy applies a voltage to the DC-DC converter 23 that adapts this voltage so that it can be injected into the electrical power distribution network 2 then used by the speed variator 22 to control the rotation speed and the torque of the motor 21 according to a control of the user, particularly via the accelerator pedal of the vehicle or any other controller.

The intrinsic features of the speed variator 22 and of the motor 21 define an operating voltage range of the drive and energy recovery system 20, particularly a minimum voltage enabling the movement of the motor 21 and a maximum voltage supported by the speed variator 22.

The motor operation mode of the drive and energy recovery system 20 is used during the movement or acceleration phases of the vehicle.

In one mode of operation called generator of the drive and energy recovery system 20, the motor 21 produces electrical energy and applies a voltage to the speed variator 22.

The drive and energy recovery system 20 then begins an energy recovery phase.

This voltage is injected into the electrical power distribution network 2 then transmitted to the DC-DC converter 23 which adapts this voltage into a charging voltage for the storage elements 11 of the storage system 10.

The generator operation mode of the drive and energy recovery system 20 is used during the braking or deceleration phases of the vehicle.

In addition, the storage system 10 may be used as main or auxiliary energy in a vehicle 1.

In the case of use of the storage system 10 as auxiliary energy, the vehicle 1 comprises an additional energy source 5 shown in dashed lines in FIG. 1.

This energy source 5 may for example be a thermal motor driving an alternator connected to the power distribution network 2 of the vehicle 1.

This type of configuration is particularly found in vehicles called hybrid vehicles 1.

In the case of use of the storage system 10 as main energy, the vehicle 1 comprises only the storage system 10 as an energy source capable of supplying the electric motor 21.

This type of configuration is particularly found in vehicles 1 intended for the transport of passengers where a rapid recharging of the storage elements 11 is possible.

Figure 2:
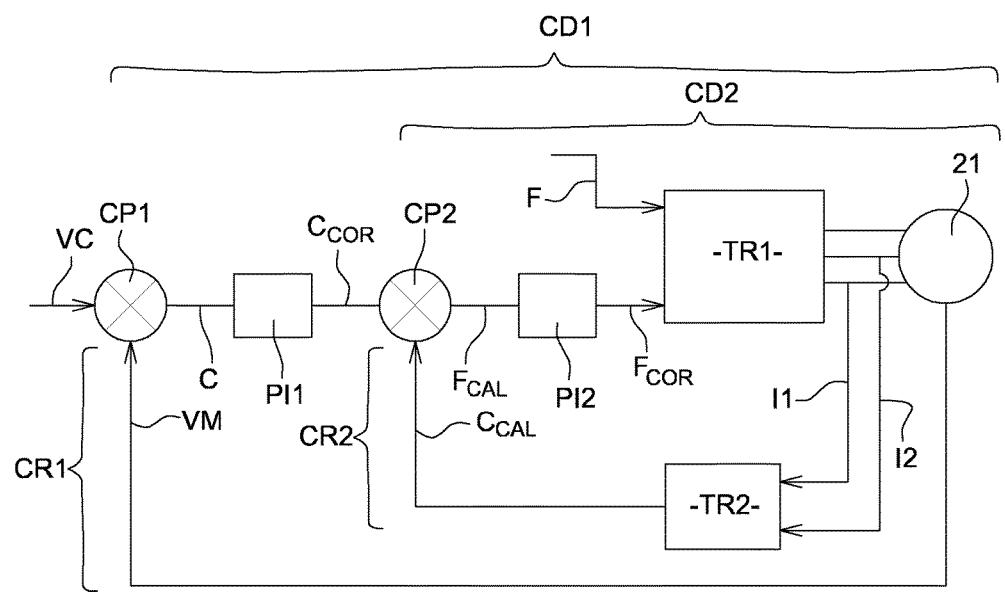
FIG. 2 represents a functional block diagram illustrating the regulation principle for an electric machine of a drive and energy recovery system of the state of the art connected to the electrical power distribution network of the vehicle with a storage system according to the state of the art.

As illustrated in FIG. 2, a regulation of the electric motor 21 of the drive and energy recovery system 20 according to the state of the art may be carried out according to two direct forward paths CD1, CD2 and two feedback paths or information paths CR1, CR2.

The first direct forward path CD1 comprises a first comparator CP1, typically a subtractor, a first regulation block, for example proportional integral PI1, a second comparator CP2, the second direct forward path CD2 and the motor 21.

The second direct forward path CD2 comprises a second regulation block, for example proportional integral PI2, and a block for transforming torque/flow into current/voltage TR1.

The first feedback path CR1 links the motor 21 to the first comparator CP1.

The second feedback path CR2 comprises a block for transforming currents into flow torque TR2 and links the inlet of the electric motor 21 to the second comparator CP2.

A setpoint speed VC, for example transmitted by a user through the accelerator pedal of the vehicle 1, as well as a measured speed VM resulting from the first feedback path is applied to the first comparator CP1 so as to deduce therefrom a setpoint torque C to be applied to the electric motor 21.

This setpoint torque C is then corrected by the first regulation block PI1 which deduces therefrom a corrected setpoint torque value $C_{COR}$ applied to the second comparator CP2.

The block for transforming currents into flow torque TR2 of the second feedback path CR2 carries out a transfer function enabling to deduce a calculated torque value $C_{CAL}$ from measurement of currents I1, I2 circulating on several phases of the electric motor 21.

This calculated torque value $C_{CAL}$ is then compared to the corrected torque setpoint value $C_{COR}$ by the second comparator CP2.

A calculated setpoint flow $F_{CAL}$ to be applied to the electric motor results from this comparison.

This calculated setpoint flow $F_{CAL}$ is then corrected by the second regulation block PI2 which deduces therefrom a corrected setpoint flow value $F_{COR}$.

This corrected setpoint flow value $F_{COR}$ is then applied at the inlet of the block for transforming torque/flow into current/voltage TR1.

The block for transforming torque/flow into current/voltage TR1 then aims to adjust a flow F that may come from the storage system 10 with the corrected flow setpoint value $F_{COR}$ so as to apply to the electric motor 21, a flow F allowing the latter to rapidly reach the setpoint speed VC.

The present invention is based on the observation according to which 75% of the energy flow of a conventional capacitor or of a supercapacitor is available between Vn and Vn/2 while 90% of the energy flow is available between Vn and Vn/3.

Figure 3:
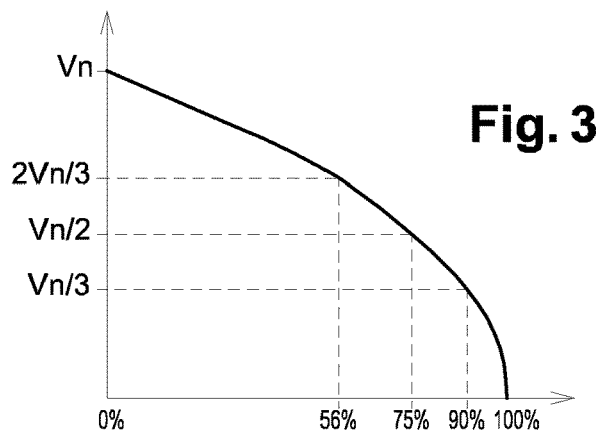
FIG. 3 shows a curve illustrating the ratio of the available energy flow of a capacitor depending on its state of charging.

Such observation may be deduced from the graph in FIG. 3.

Thus, the sizing of the storage system 10 is performed by matching the operating voltage range of the speed variator 22 with an allowable voltage range to define the charging state of the capacitive storage elements 11, for example between Vn and Vn/2, where Vn is the maximum operating voltage of the storage elements 11.

This sizing can be optimized by the use of hybrid supercapacitors or supercapacitances technologies arranged to supply more than 75% of their energy flow available in the range of operation of the drive and energy recovery system. As aforementioned, this available energy also called useful energy is defined by the formula:

$$E = \frac{1}{2}CV^2$$

These supercapacitors called <<hybrid>> supercapacitors such as for example Lithium capacitors, have an energy density more significant than conventional supercapacitances and allow using 75% of their energy flow available between for example Vn and 2Vn/3. This ability provides a better adaptation of the voltage range of the useful energy to the range of operation of the drive and energy recovery system 20.

This disposition enables increasing the energy density of the storage elements on a more significant part of the operating voltage range of the drive and energy recovery system, and thus facilitating the charging control of the storage elements 11 by a control device 12.

Figure 5:
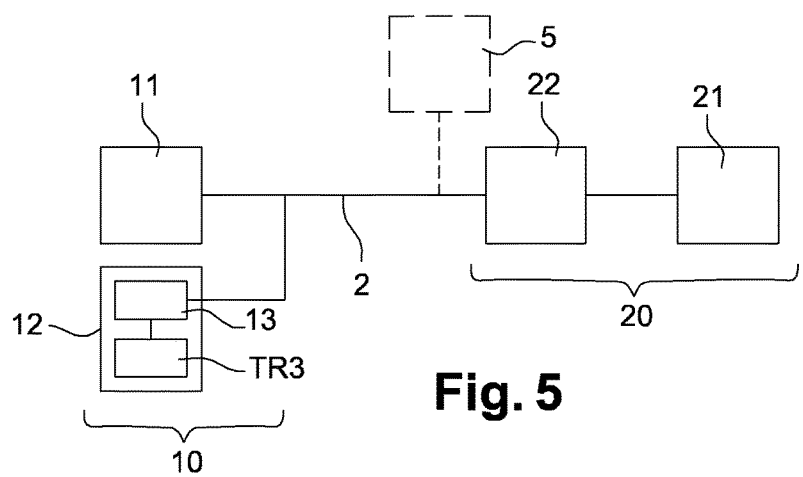
FIG. 5 represents a schematic diagram of an electrical power distribution network of the vehicle on which is connected a storage system according to the invention as main or auxiliary energy and a drive and energy recovery system according to the invention.

As illustrated in FIG. 5, an electric vehicle 1 according to the invention also includes an electrical power distribution network 2 on which are connected a drive and energy recovery system 20 and a storage system 10.

However, unlike a storage system 10 of the state of the art, the storage system 10 according to the invention no longer comprises DC-DC converter 23.

Indeed, the storage system 10 comprises only capacitive storage elements 11 and the control device 12 of the charging of the capacitive storage elements 11.

Figure 6:
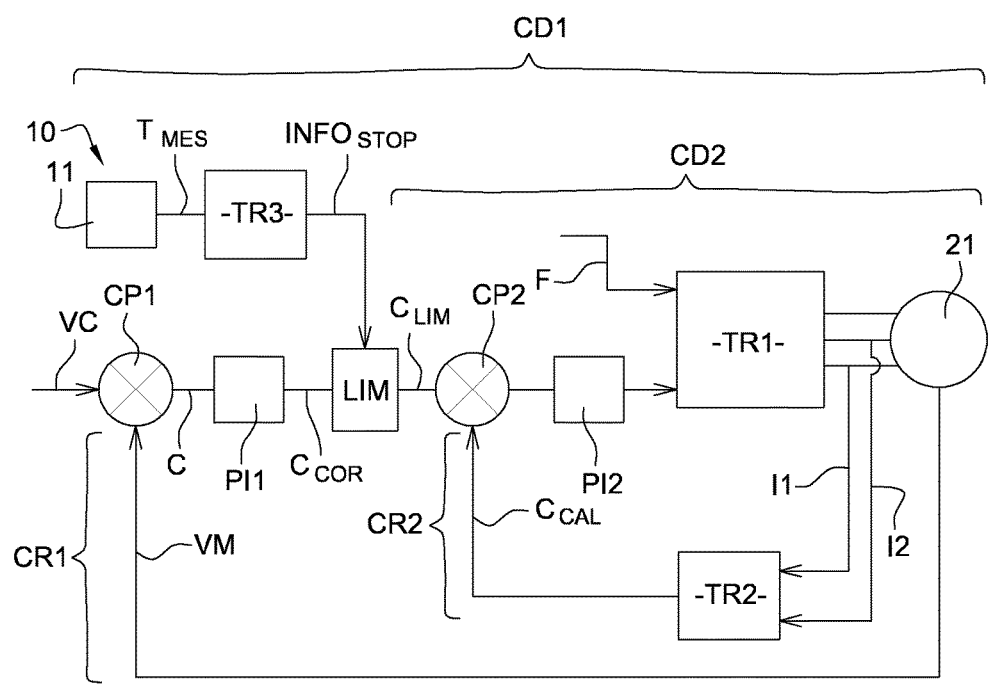
FIG. 6 shows a functional block diagram illustrating the regulation principle for a reversible electric machine of a drive and energy recovery system according to the invention connected to the electrical power distribution network of the vehicle with a storage system according to the invention.

As illustrated in FIG. 6, a regulation of the electric motor 21 of the drive and energy recovery system 20 according to the invention differs from a regulation of the electric motor 21 of a drive and energy recovery system 20 according to the state of the art, in that it further achieves particularly a voltage measurement $T_{MES}$ on the capacitive storage elements 11 to find out the charging state of the latter or on the electrical power distribution network 2 to find out the value of a possible charging voltage of the capacitive storage elements 11.

A block for transforming voltage into energy recovery stop setpoint TR3 then interprets this voltage measurement $T_{MES}$ and optionally delivers an energy recovery stop setpoint $INFO_{STOP}$ if this voltage measurement $T_{MES}$ is greater than the maximum voltage value Vn of the storage elements 11.

This energy recovery stop setpoint $INFO_{STOP}$ is received by a torque setpoint limiting block LIM which limits the corrected setpoint torque value $C_{COR}$ to a limited setpoint torque value $C_{LIM}$ which is compared by the second comparator CP2 to the calculated torque value $C_{CAL}$.

In the shown example, this information <<charging end>> $INFO_{STOP}$ of the storage system 10 is sent to the speed variator 22. The latter then stops sending energy to the power distribution network 2.

This can be obtained either by controlling the motor 21 so that no energy is returned by the speed variator 22, or by deriving this energy to resistances called braking resistances.

The voltage measurement member 13 enables the voltage measurement $T_{MES}$, the block TR3 for transforming voltage into energy recovery stop setpoint as well as the block LIM for limiting torque setpoint are more generally comprised in a control device 12 of the storage system 10.

This control device 12 is arranged to:

authorize the charging of the capacitive storage elements 11 when the voltage of the capacitive storage elements 11 is lower than or equal to the maximum voltage value of the range of operation of the drive and energy recovery system 20, and prohibit the charging of the capacitive storage elements 11 when the voltage of the storage elements of the electrical power distribution network 2 of the vehicle is greater than the maximum voltage value Vn of the capacitive storage elements 11.

These two conditions are also comprised in a step of a control method according to the invention comprising controlling the charging voltage of the capacitive storage elements 11.

In the shown example, the storage system 10 must integrate the intrinsic features of the speed variator 22, particularly its voltage operation range so as to define a range of operation of the capacitive storage elements 11 depending on the range of operation of the speed variator 22.

This integration is carried out by sizing the storage system 10 during the installation of the storage system 10 in the vehicle 1.

Figure 4:
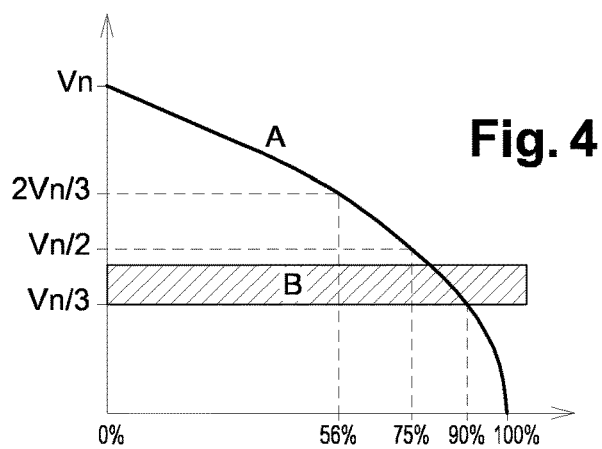
FIG. 4 shows a similar curve to that of FIG. 3 on which was added a range of operation of a generator.

According to a variant illustrated by the graph of FIG. 4, when the storage system 10 comprises the auxiliary energy of the vehicle illustrated by the voltage curve A on the graph of FIG. 4 and when the main energy is supplied by a generator 5 illustrated by the operating voltage range of the generator B on the graph of FIG. 4, for example a thermal or biomass generator, or a fuel cell, then the charging voltage of the capacitive storage elements 11 of the storage system 10 is calculated so that the allowable voltage range to define the charging state of the storage elements 11 of the storage system 10 is located beyond the operating voltage range of the generator 5.

In this case, the operating voltage range of the generator 5 comprises a minimum voltage value corresponding to the minimum value of the operating voltage range of the current converter 22.

In this manner, the energy chiefly used is the one coming from the storage system 10, the energy of the generator 5 succeeding when the storage system 10, while discharging, reaches the operating voltage of the generator 5.

Similarly, during an energy recovery phase, the no-load voltage of the generator 5 will correspond to the charging start voltage of the storage system 10.

According to one variant of the invention, the control device 12 can comprise electrical insulator (not shown) of the storage elements 10 which electrically cut off the connection between the capacitive storage elements 11 and the electrical power distribution network, so as to allow isolating the capacitive storage elements 11 while allowing to the drive and energy recovery system 20 to continue operating.

Finally, the storage system 10 may comprise a first charging device (not shown) called pre-charging device intended to be connected on the electrical power distribution network 2 between the capacitive storage elements 11 and the drive and energy recovery system 20 which allows the storage system 20 to reach its minimum operating voltage when the vehicle is turned on while minimizing the inrush current.

This resistive device is then deleted by insertion in parallel of a current path. A static relay or electromechanical contactor can be used for this purpose.

Although the invention has been described relative to particular embodiments, it is obvious that it is in no way limited and that it comprises all technical equivalents of means described as well as the combinations thereof.

The invention claimed is:

1. An electrical energy storage system of a vehicle, intended to be connected to an electrical power distribution network, the vehicle including a drive and energy recovery system connected to the electrical power distribution network, said drive and energy recovery system being configured to operate in an operating voltage range, the storage system including:
   capacitive storage elements comprising a maximum operating voltage and configured to be charged by a charging voltage delivered by the electrical power distribution network comprised in the range of operation of the drive and energy recovery system, and
   said storage comprises a control device arranged to:
      authorize the charging of the capacitive storage elements when the voltage of the capacitive storage elements is lower than or equal to the maximum voltage value of the range of operation of the drive and energy recovery system,
      prohibit the charging of the capacitive storage elements when the voltage of the electrical power distribution network of the vehicle is greater than the maximum operating voltage value of the storage elements,
   said storage system further comprises a first charging device called pre-charging device intended to be connected on the electrical power distribution network between the capacitive storage elements and the drive and energy recovery system.

2. The storage system according to claim 1, wherein the control device includes a measurement member of the voltage delivered by the capacitive storage elements or by the electrical power distribution network of the vehicle able to transmit to the drive and energy recovery system a piece of information intended to cause the energy recovery by the drive and energy recovery system to stop.

3. The storage system according to claim 1, wherein the control device comprises electrical insulator of the capacitive storage elements.

4. The storage system according to claim 1, wherein the capacitive storage elements include a supercapacitors assembly in particular hybrid supercapacitors arranged to provide more than 75% of their energy flow available in the range of operation of the drive and energy recovery system.

5. A drive and energy recovery system of a vehicle, this vehicle including:
   an electrical power distribution network, and
   a electrical energy storage system of the vehicle according to claim 1 connected to the electrical power distribution network,
   the drive and energy recovery system being wherein the operating voltage range of the drive and energy recovery system corresponds to the operating voltage range of the current converter.

6. The drive and energy recovery system according to claim 5, comprising a generator arranged to operate on an operating voltage range, said operating voltage range of the generator comprising a minimum voltage value corresponding to the minimum value of the operating voltage range of the current converter.

7. An electric vehicle comprising an electrical power distribution network on which is connected a storage system according to claim 1 and a drive and energy recovery system.

8. A control method for an electrical energy storage system of a vehicle, this vehicle including:
   an electrical power distribution network, and
   a drive and energy recovery system connected to the electrical power distribution network,
   the storage system including:
   capacitive storage elements comprising a maximum operating voltage and being likely to be charged by a charging voltage delivered by the electrical power distribution network comprised in the range of operation of the drive and energy recovery system, and
   a first charging device called pre-charging device intended to be connected on the electrical power distribution network between the capacitive storage elements and the drive and energy recovery system,
   said drive and energy recovery system being configured to operate in an operating voltage range,
   said control method wherein it comprises a step comprising controlling the charging voltage of the capacitive storage elements or the voltage of the electrical power distribution network of the vehicle so as to:
   authorize the charging of the capacitive storage elements when the voltage of the storage elements is lower than or equal to the maximum voltage value of the range of operation of the drive and energy recovery system, or
   prohibit the charging of the capacitive storage elements when the voltage of the electrical power distribution network of the vehicle is greater than the maximum operating voltage value of the capacitive storage elements,
   said control method further including a step of turning on the vehicle storage elements to reach a minimum operating voltage while limiting the inrush current.

9. The control method according to claim 8, wherein the step of controlling the charging voltage of the capacitive storage elements or the voltage of the electrical power distribution network of the vehicle comprises the sub-steps comprising:
- (i) measuring the voltage delivered by the capacitive storage elements or by the electrical power distribution network of the vehicle, and
- (ii) transmitting to the drive and energy recovery system a piece of information intended to cause the energy recovery by the drive and energy recovery system to stop.

* * * * *